(12) United States Patent
Hattori

(10) Patent No.: US 6,176,422 B1
(45) Date of Patent: Jan. 23, 2001

(54) INFORMATION STORAGE DEVICE, SCANNER AND INFORMATION STORAGE AND REPRODUCING APPARATUS

(75) Inventor: Yutaka Hattori, Kanagawa (JP)

(73) Assignee: The Yokohama Rubber Co., Ltd., Tokyo (JP)

( * ) Notice: Under 35 U.S.C. 154(b), the term of this patent shall be extended for 0 days.

(21) Appl. No.: 09/476,889

(22) Filed: Jan. 3, 2000

Related U.S. Application Data

(62) Division of application No. 08/767,495, filed on Dec. 16, 1996, now Pat. No. 6,105,860.

(51) Int. Cl.[7] .................................................... G06F 17/00
(52) U.S. Cl. ................................. 235/375; 235/472.01
(58) Field of Search .............................. 235/375, 472.01

(56) References Cited

U.S. PATENT DOCUMENTS

| 4,546,241 | 10/1985 | Walton ................................ 235/380 |
| 4,580,041 | 4/1986 | Walton ................................ 235/380 |
| 4,818,855 | 4/1989 | Mongeon et al. .................... 235/440 |
| 4,918,416 | 4/1990 | Walton et al. ....................... 235/497 |
| 5,347,263 | 9/1994 | Carroll et al. . |
| 5,353,011 | 10/1994 | Wheeler et al. . |
| 5,362,954 | 11/1994 | Komatsu . |
| 5,763,867 | 6/1998 | Main et al. . |
| 5,767,501 | * 6/1998 | Schmidt ........................ 235/472.01 |

\* cited by examiner

Primary Examiner—Harold I. Pitts
(74) Attorney, Agent, or Firm—Arent Fox Kintner Plotkin & Kahn, PLLC

(57) ABSTRACT

An information storage device and an information storage and reproducing apparatus for facilitating the management of information about products and users. A storage device 1 receives an electromagnetic wave through its receiving antenna 11, and produces a DC current, which powers the constituting elements in the storage device 1. A central processor unit 13 thus powered reads the information in a memory 14 and feeds it via a transmitting module 15 to a transmitting antenna 16, which in turns transmits the information on an electromagnetic wave. A scanner 2 transmits the electromagnetic wave through its transmitting module 26 and transmitting antenna 27 to energize the storage device 1, while receiving, through its receiving antenna 21 and receiving module 22, the electromagnetic wave transmitted by the storage device 1. A central processor unit 23 processes the received signal, namely the information stored in the storage device 1, and displays it on a display unit 25.

14 Claims, 6 Drawing Sheets

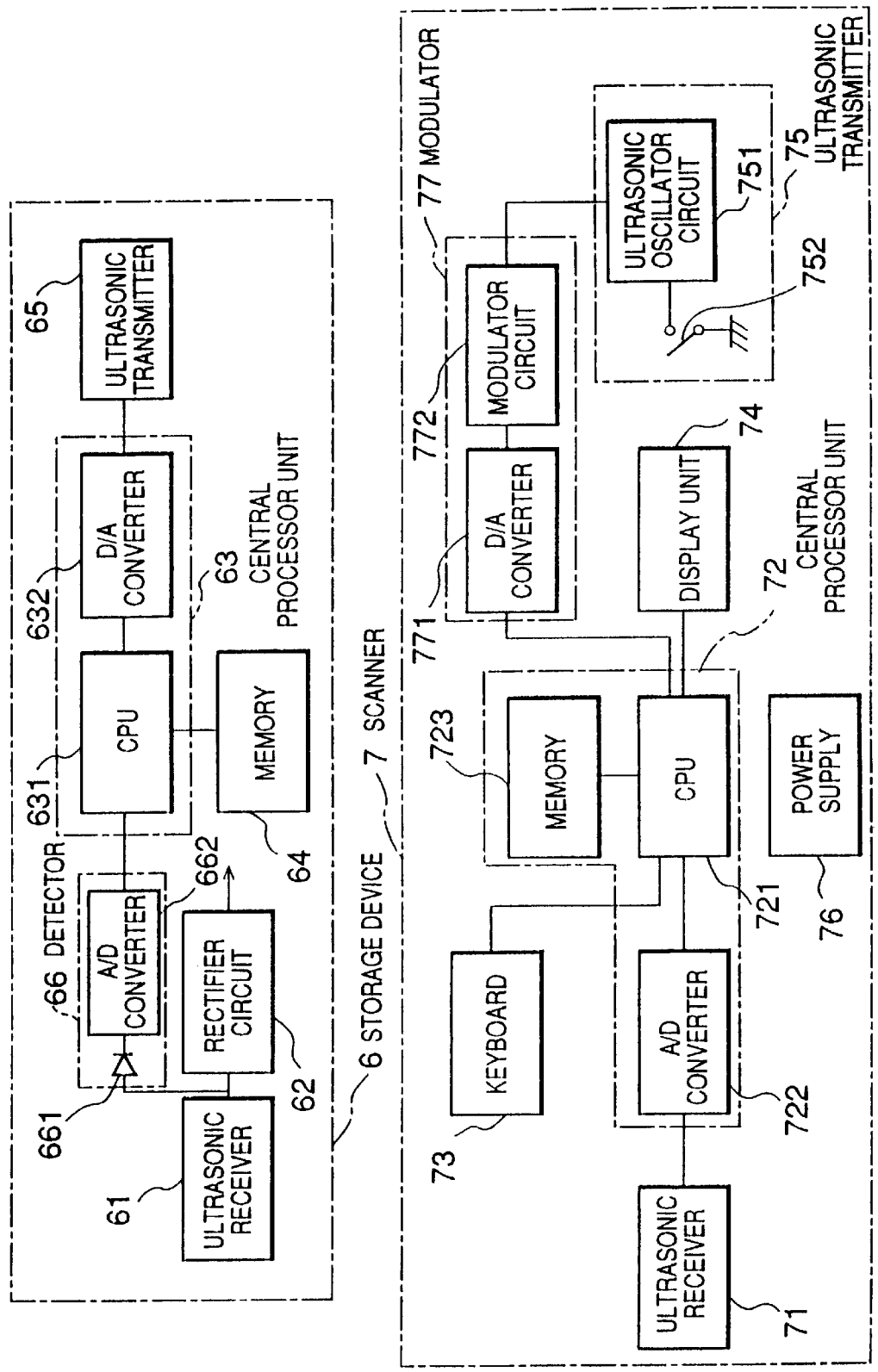

INFORMATION STORAGE DEVICE, SCANNER AND INFORMATION STORAGE AND REPRODUCING APPARATUS

This application is a divisional application under 37 C.F.R. §1.53(b) of application Ser. No. 08/767,495, filed Dec. 16, 1996, U.S. Pat. No. 6,105,860 Aug. 22, 2000.

BACKGROUND OF THE INVENTION

1. Field of the Invention

The present invention relates to an information storage device capable of reading and writing information thereon in a wireless manner, a scanner and an information storage and reproducing apparatus incorporating the information storage device and the scanner.

2. Description of the Related Art

Computer-based electronic management systems are today in widespread use in a diversity of application fields. In the management of products, for example, each product is associated with a label bearing a known bar code that designates its model name, date of manufacture, lot number and the like, and a computer is used to manage the product history and other related data. Magnetic cards are used as membership cards for a variety of clubs and credit cards, in which required information is stored in the magnetic cards to manage the information about their users.

In the product management that employs the known bar code, however, managing the product history for each product on an individual basis is difficult. Namely, it is difficult to tag each individual product with its bar code for identifying it. Even if such an identifying bar code can be attached to the product, encoding its product history information into its bar code and attaching it to the product is very difficult, if not impossible. To manage each product on an individual basis, therefore, a host computer must store history information of each product, and entry of such individual information is time-consuming. Furthermore, the bar code labels attached to the products naturally age, sometimes to the extent that the bar code is illegible.

When the information of the users is managed using the magnetic cards, the magnetic card age and thus have to be periodically renewed.

SUMMARY OF THE INVENTION

Accordingly, it is an object of the present invention to provide an information storage device, a scanner and an information storage and reproducing apparatus which allow the information of each product, users and the like to be easily managed.

To achieve the above object of the present invention, an information storage device for reading information in a wireless manner, in its first aspect, comprises a receiving antenna, a transmitting antenna, a rectifier circuit for generating a predetermined DC current based on the current induced in response to the electromagnetic wave at a first frequency input to the receiving antenna, a semiconductor memory operating from the DC current output from the rectifier circuit, a central processor unit operating from the DC current output from the rectifier circuit, for reading information stored in the semiconductor memory, and a high-frequency transmitting module operating from the DC current output from the rectifier circuit, for feeding the information read by the central processor unit as a high-frequency signal at a second frequency to the transmitting antenna.

When the receiving antenna receives the first frequency electromagnetic wave from outside the information storage device, the rectifier circuit rectifies the input current induced in response to the electromagnetic wave, resulting in a DC current. The DC current is supplied to the semiconductor memory, central processor unit and high-frequency transmitting module. While the first frequency electromagnetic wave is received, namely, while the DC current is fed from the rectifier circuit, the central processor unit reads the information stored in the semiconductor memory. The high-frequency transmitting module feeds the read information at the second high-frequency signal to the transmitting antenna, where the second high-frequency signal is transmitted on an electromagnetic wave. The stored information in the storage device is transmitted on the second frequency electromagnetic wave at almost the same time the first frequency electromagnetic wave is transmitted. Thus, the stored information is acquired by receiving the second frequency electromagnetic wave. The information storage device needs no internal power supply, thus permitting a semi-permanent use in a maintenance-free fashion.

An information storage device of present invention in its second aspect comprises a detector circuit connected to the receiving antenna, for detecting the current induced in response to the first frequency electromagnetic wave input to the receiving antenna, whereby said central processor unit reads the information stored in the semiconductor memory according to a predetermined read command contained in the signal coming in from the detector circuit.

When the receiving antenna receives the first frequency electromagnetic wave from outside the information storage device, the rectifier circuit rectifies the input current induced in response to the electromagnetic wave, resulting in a DC current. The DC current is supplied to the semiconductor memory, central processor unit and high-frequency transmitting module. The detector circuit detects the current induced in response to the first frequency electromagnetic wave input to the receiving antenna, and the detected signal is fed to the central processor unit. While the first frequency electromagnetic wave is received, namely, while the DC current is fed from the rectifier circuit, the central processor unit reads the information stored in the semiconductor memory in response to the read command contained in the signal coming in from the detector circuit. The high-frequency transmitting module feeds the read information at the second high-frequency signal to the transmitting antenna, where the second high-frequency signal is transmitted on an electromagnetic wave.

Therefore, the stored information in the storage device is transmitted on the second frequency electromagnetic wave at almost the same time the information read command is transmitted at the first frequency electromagnetic wave. The stored information is acquired by receiving the second frequency electromagnetic wave. The information storage device needs no internal power supply, thus permitting a semi-permanent use in a maintenance-free fashion.

An information storage device of the present invention in its third aspect comprises a detector circuit connected to the receiving antenna, for detecting the current induced in response to the first frequency electromagnetic wave input to the receiving antenna, whereby said central processor unit reads the information stored in the semiconductor memory according to a predetermined read command contained in the signal coming in from the detector circuit while writing, according to a predetermined write command contained in said signal, information coming in succession to the write command onto a predetermined address in the semiconductor memory.

When the receiving antenna receives the first frequency electromagnetic wave from outside the information storage device, the rectifier circuit rectifies the input current induced in response to the electromagnetic wave, resulting in a DC current. The DC current is supplied to the semiconductor memory, central processor unit and high-frequency transmitting module. The detector circuit detects the current induced in response to the first frequency electromagnetic wave input to the receiving antenna, and the detected signal is fed to the central processor unit.

While the first frequency electromagnetic wave is received, namely, while the DC current is fed from the rectifier circuit, the central processor unit reads the information stored in the semiconductor memory in response to the read command contained in the signal coming in from the detector circuit. The high-frequency transmitting module feeds the read information at the high-frequency signal at the second frequency to the transmitting antenna, where the high-frequency signal is transmitted on the second frequency electromagnetic wave.

When receiving the write command contained in the signal coming in from the detector circuit, the central processor unit stores the information coming in succession to the write command onto the predetermined address in the semiconductor memory.

By transmitting the information read command, information write command, and information to be written on the first frequency electromagnetic wave from outside the information storage device, the information stored in the information storage device is transmitted on the second frequency electromagnetic wave, or the information is written onto the semiconductor memory. The stored information is acquired by receiving the second frequency electromagnetic wave transmitted from the information storage device. Furthermore, the information in the semiconductor memory is updated. The information storage device needs no internal power supply, thus permitting a semi-permanent use in a maintenance-free fashion.

An information storage device, in the fourth aspect of the present invention, comprises the above-described constituting elements in the storage device, each of which is packaged in a ceramic mold. The elements in the information storage device packaged in a ceramic mold exhibit an excellent durability.

An information storage device for reading information in a wireless manner, in the fifth aspect of the present invention, comprises an ultrasonic receiver for receiving an ultrasonic wave at a first frequency, an ultrasonic transmitter for transmitting an ultrasonic wave at a second frequency in response to input information, a rectifier circuit for generating a predetermined DC current based on the current induced in response to the first frequency ultrasonic wave input to the ultrasonic receiver, a semiconductor memory operating from the DC current output from the rectifier circuit, a central processor unit operating from the DC current output from the rectifier circuit, for reading information stored in the semiconductor memory, and a transmitting module operating from the DC current output from the rectifier circuit, for feeding the information read by the central processor unit to the ultrasonic transmitter.

When the ultrasonic receiver receives the first frequency ultrasonic wave from outside the information storage device, the rectifier circuit derives a DC current from the energy of the ultrasonic wave. The DC current is supplied to the semiconductor memory, central processor unit and high-frequency transmitting module. While the first frequency ultrasonic wave is received, namely, while the DC current is fed from the rectifier circuit, the central processor unit reads the information stored in the semiconductor memory. The ultrasonic transmitter transmits the read information at the second ultrasonic frequency. The information stored in the storage device is transmitted at the second ultrasonic frequency at almost the same time the ultrasonic wave is transmitted at the first frequency from outside the information storage device. The stored information is acquired by receiving the second frequency ultrasonic wave. The information storage device needs no internal power supply, thus permitting a semi-permanent use in a maintenance-free fashion.

An information storage device of the present invention in its sixth aspect comprises a detector circuit connected to the ultrasonic receiver, for detecting the current induced in response to the first frequency ultrasonic wave input to the ultrasonic receiver, whereby said central processor unit reads the information stored in the semiconductor memory according to a predetermined read command contained in the signal coming in from the detector circuit.

When the ultrasonic receiver receives the first frequency ultrasonic wave from outside the information storage device, the rectifier circuit derives a DC current from the ultrasonic wave. The DC current is supplied to the semiconductor memory, central processor unit and high-frequency transmitting module. The detector circuit detects the current induced in response to the first frequency ultrasonic wave input to the ultrasonic receiver, and the detected signal is fed to the central processor unit.

While the first frequency ultrasonic wave is received, namely, while the DC current is fed from the rectifier circuit, the central processor unit reads the information stored in the semiconductor memory in response to the read command contained in the signal coming in from the detector circuit. The ultrasonic transmitter transmits the read information on the second frequency ultrasonic wave.

The information stored in the storage device is transmitted at the second ultrasonic frequency at almost the same time the information read command is transmitted on the first frequency ultrasonic wave from outside the information storage device. The stored information is acquired by receiving the second frequency ultrasonic wave. The information storage device needs no internal power supply, thus permitting a semi-permanent use in a maintenance-free fashion.

An information storage device of the present invention in its seventh aspect comprises a detector circuit connected to the ultrasonic receiver, for detecting the current induced in response to the first frequency ultrasonic wave input to the ultrasonic receiver, whereby said central processor unit reads the information stored in the semiconductor memory according to a predetermined read command contained in the signal coming in from the detector circuit while writing, according to a predetermined write command contained in said signal, information coming in succession to the write command onto a predetermined address in the semiconductor memory.

When the ultrasonic receiver receives the first frequency ultrasonic wave from outside the information storage device, the rectifier circuit derives a DC current from the ultrasonic wave. The DC current is supplied to the semiconductor memory, central processor unit and high-frequency transmitting module. The detector circuit detects the current induced in response to the first frequency ultrasonic wave input to the ultrasonic receiver, and the detected signal is fed to the central processor unit.

While the first frequency ultrasonic wave is received, namely, while the DC current is fed from the rectifier circuit, the central processor unit reads the information stored in the semiconductor memory in response to the read command contained in the signal coming in from the detector circuit. The ultrasonic transmitter transmits the read information on the second frequency ultrasonic wave.

When receiving the write command contained in the signal coming in from the detector circuit, the central processor unit stores the information coming in succession to the write command onto the predetermined address in the semiconductor memory.

The information stored in the information storage device is transmitted on the second frequency electromagnetic wave at almost the same time the information read command, information write command, and information to be written are transmitted on the first frequency electromagnetic wave from outside the information storage device, or the information is written onto the semiconductor memory. The stored information is acquired by receiving the second frequency electromagnetic wave derived from the information storage device. Furthermore, the information in the semiconductor memory is updated. The information storage device needs no internal power supply, thus permitting a semi-permanent use in a maintenance-free fashion.

An information storage device, in eighth aspect of the present invention, comprises the above-described constituting elements in the storage device, each of which is packaged in a ceramic mold. The elements in the information storage device packaged in a ceramic mold exhibit an excellent durability.

A scanner for reading information from an information storage device in a wireless manner, in the ninth aspect of the present invention, comprises a transmitting antenna, a receiving antenna, a transmitting module for feeding a high-frequency signal at a first frequency to the transmitting antenna, and a receiving module for extracting information contained in a high-frequency signal at a second frequency input thereto from the receiving antenna, whereby the high-frequency signal at the first frequency is transmitted while the information is read from the information storage device using the high-frequency signal at the second frequency.

To read the information from the storage device, the transmitting module of the scanner feeds the first frequency signal to the transmitting antenna which, in turn, transmits the first frequency electromagnetic wave to irradiate the storage device. The information storage device is thus energized. The second frequency electromagnetic wave transmitted from the information storage device is fed to the receiving module via the receiving antenna. The receiving module extracts the information from the high-frequency signal at the second frequency, thus allowing the information stored in the storage device to be read.

The information stored in the storage device is transmitted on the second frequency electromagnetic wave at almost the same time the information storage device is irradiated with the first frequency electromagnetic wave using the scanner. The stored information is thus acquired by receiving it through the scanner.

A scanner for reading information from an information storage device in a wireless manner, in the tenth aspect of the present invention, comprises a transmitting antenna, a receiving antenna, a transmitting module for feeding an information read command as a high-frequency signal at a first frequency to the transmitting antenna, and a receiving module for extracting information contained in a high-frequency signal at a second frequency input thereto from the receiving antenna, whereby the high-frequency signal at the first frequency is transmitted while the information is read from the information storage device based on the high-frequency signal at the second frequency.

To read the information from the information storage device, the transmitting module of the scanner feeds the information read command as the high-frequency signal at the first frequency to the transmitting antenna which, in turn, transmits the first frequency electromagnetic wave to irradiate the storage device. The information storage device is thus energized.

The second frequency electromagnetic wave transmitted from the information storage device is fed to the receiving module in the scanner via the receiving antenna. The receiving module extracts the information from the high-frequency signal at the second frequency, thus allowing the information stored in the storage device to be read.

The information stored in the storage device is transmitted on the second frequency electromagnetic wave at almost the same time the information storage device is irradiated with the first frequency electromagnetic wave according to the information read command from outside the storage device using the scanner. The stored information is thus acquired by receiving it through the scanner.

A scanner for reading information from and writing information to an information storage device in a wireless manner, in the eleventh aspect of the present invention, comprises a transmitting antenna, a receiving antenna, a transmitting module for feeding an information read command or an information write command and information as a high-frequency signal at a first frequency to the transmitting antenna, and a receiving module for extracting information contained in a high-frequency signal at a second frequency input thereto from the receiving antenna, whereby the high-frequency signal at the first frequency is transmitted to write to the storage device while the information is read from the information storage device using the high-frequency signal at the second frequency.

To read the information from or write the information to the information storage device, the transmitting module of the scanner feeds the information read command, information write command and information being written as the high-frequency signal at the first frequency to the transmitting antenna which, in turn, transmits the first frequency electromagnetic wave to irradiate the storage device. The information storage device is thus energized.

The second frequency electromagnetic wave transmitted from the information storage device is fed to the receiving module in the scanner via the receiving antenna. The receiving module extracts the information from the high-frequency signal at the second frequency, thus allowing the information stored in the storage device to be read.

The information stored in the storage device is transmitted on the second frequency electromagnetic wave at almost the same time the information storage device is irradiated with the first frequency electromagnetic wave according to the information read command from outside the storage device using the scanner. The stored information is thus acquired by receiving it through the scanner.

Furthermore, the information storage device is irradiated with the first frequency electromagnetic wave according to the information write command and the information being written from outside the storage device using the scanner, and the information being written is stored in the semiconductor memory in the storage device. The stored information is thus easily updated.

A scanner for reading information from an information storage device in a wireless manner, in the twelfth aspect of the present invention, comprises an ultrasonic transmitter for transmitting an ultrasonic wave at a first frequency, an ultrasonic receiver for receiving an ultrasonic wave at a second frequency, a signal extracting module for extracting a signal component from the current induced in response to the second frequency ultrasonic wave received by the ultrasonic receiver, and an information extracting module for extracting information from the signal provided by the signal extracting module, whereby the ultrasonic wave signal at the first frequency is transmitted while the information is read from the information storage device using the ultrasonic wave signal at the second frequency.

The information storage device is irradiated with the first frequency ultrasonic wave transmitted by the ultrasonic transmitter of the scanner. The information storage device is thus energized. The second frequency ultrasonic wave transmitted from the information storage device is fed to the signal extracting module via the ultrasonic receiver in the scanner. The signal extracting module extracts the signal component from the second frequency ultrasonic wave. The information extracting module extracts the information to be read from the signal component, thereby allowing the information stored in the information storage device to be read.

The information stored in the storage device is transmitted on the second frequency ultrasonic wave at almost the same time the information storage device is irradiated with the first frequency ultrasonic wave from outside the storage device using the scanner. The stored information is thus acquired by receiving it through the scanner.

A scanner for reading information from an information storage device in a wireless manner, in the thirteenth aspect of the present invention, comprises an ultrasonic transmitter for transmitting an information read command on an ultrasonic wave at a first frequency, an ultrasonic receiver for receiving an ultrasonic wave at a second frequency, a signal extracting module for extracting a signal component from the current induced in response to the second frequency ultrasonic wave received by the ultrasonic receiver, and an information extracting module for extracting information from the signal provided by the signal extracting module, whereby the ultrasonic wave signal at the first frequency is transmitted while the information is read from the information storage device using the ultrasonic wave signal at the second frequency.

To read the information from the information storage device, it is irradiated with the first frequency ultrasonic wave that is transmitted by the ultrasonic transmitter of the scanner based on the information read command. The information storage device is thus supplied with energy and commands. The second frequency ultrasonic wave transmitted from the information storage device is fed to the signal extracting module via the ultrasonic receiver in the scanner. The signal extracting module extracts the signal component from the second frequency ultrasonic wave. The information extracting module extracts the information to be read from the signal component, thereby allowing the information stored in the information storage device to be read.

The information stored in the storage device is transmitted on the second frequency ultrasonic wave at almost the same time the information storage device is irradiated with the first frequency ultrasonic wave from outside the storage device using the scanner according to the read command. The stored information is thus acquired by receiving it through the scanner.

A scanner for reading information from and writing information to an information storage device in a wireless manner, in the fourteenth aspect of the present invention, comprises an ultrasonic transmitter for transmitting an information read command or an information write command and information on an ultrasonic wave at a first frequency, an ultrasonic receiver for receiving an ultrasonic wave at a second frequency, a signal extracting module for extracting a signal component from the current induced in response to the second frequency ultrasonic wave received by the ultrasonic receiver, and an information extracting module for extracting information from the signal provided by the signal extracting module, whereby the ultrasonic wave signal at the first frequency is transmitted to write to the storage device while the information is read from the information storage device using the ultrasonic wave signal at the second frequency.

To read information from and write information to the information storage device, it is irradiated with the first frequency ultrasonic wave that is transmitted by the ultrasonic transmitter of the scanner based on the information read command, the write command and the information being written. The information storage device is thus supplied with energy and commands. The second frequency ultrasonic wave transmitted from the information storage device is fed to the signal extracting module via the ultrasonic receiver in the scanner. The signal extracting module extracts the signal component from the second frequency ultrasonic wave. The information extracting module extracts the information to be read from the signal component, thereby allowing the information stored in the information storage device to be read.

The information stored in the storage device is transmitted on the second frequency ultrasonic wave at almost the same time the information storage device is irradiated with the first frequency ultrasonic wave from outside the storage device using the scanner according to the read command. The stored information is thus acquired by receiving it through the scanner.

Furthermore, the information storage device is irradiated with the first frequency electromagnetic wave based on the information write command and the information being written from outside the storage device using the scanner, the information is stored in the semiconductor memory in the storage device. The stored information is thus easily updated.

An information storage and reproducing apparatus for reading information from a storage device in a wireless manner, in the fifteenth aspect of the present invention, comprises said storage device comprising a receiving antenna, a transmitting antenna, a rectifier circuit for generating a predetermined DC current based on the current induced in response to the electromagnetic wave at a first frequency input to the receiving antenna, a semiconductor memory operating from the DC current output from the rectifier circuit, a central processor unit operating from the DC current output from the rectifier circuit, for reading information stored in the semiconductor memory, and a high-frequency transmitting module operating from the DC current output from the rectifier circuit, for feeding the information read by the central processor unit as a high-frequency signal at a second frequency to the transmitting antenna; and a scanner comprising a transmitting antenna, a receiving antenna, a transmitting module for feeding a high-frequency signal at the first frequency to the transmitting antenna, and a receiving module for extracting information contained in a high-frequency signal at the second frequency input thereto from the receiving antenna.

In the above information storage and reproducing apparatus, to read information from the storage device, the first frequency signal is fed from the transmitting module to the transmitting antenna in the scanner, which in turn transmits the corresponding first frequency electromagnetic wave to irradiate the storage device. The storage device receives through its receiving antenna the first frequency electromagnetic wave, the corresponding current of which is rectified by the rectifier circuit into the DC current. The DC current is supplied to the semiconductor memory, central processor unit and high-frequency transmitting module to drive them. While the first frequency electromagnetic wave is received, namely, while the DC current is fed from the rectifier circuit, the central processor unit reads the information stored in the semiconductor memory. The high-frequency transmitting module feeds the read information as the high-frequency signal at the second frequency to the transmitting antenna, which in turn transmits the read information on the second frequency electromagnetic wave. The second frequency electromagnetic wave is received by the receiving antenna in the scanner, and its corresponding signal reaches the receiving module. The receiving module extracts information from the second frequency signal, thus reading the information stored in the storage device.

The stored information in the storage device is transmitted on the second frequency electromagnetic wave at almost the same time the first frequency electromagnetic wave is transmitted by the scanner from outside the storage device. Thus, the stored information is acquired by receiving it through the scanner. The information storage device needs no internal power supply, thus permitting a semi-permanent use in a maintenance-free fashion.

An information storage and reproducing apparatus for reading information from a storage device in a wireless manner, in the sixteenth aspect of the present invention, comprises said storage device comprising a receiving antenna, a transmitting antenna, a detector circuit for detecting the current induced in response to an electromagnetic wave at a first frequency input to the receiving antenna, a rectifier circuit for generating a predetermined DC current based on the current corresponding the first frequency electromagnetic wave input to the receiving antenna, a semiconductor memory operating from the DC current output from the rectifier circuit, a central processor unit operating from the DC current output from the rectifier circuit, for reading the information stored in the semiconductor memory according to a predetermined read command contained in the signal coming in from the detector circuit, and a high-frequency transmitting module operating from the DC current output from the rectifier circuit, for feeding the information read by the central processor unit as a high-frequency signal at a second frequency to the transmitting antenna; and a scanner comprising a transmitting antenna, a receiving antenna, a transmitting module for feeding said read command as a high-frequency signal at the first frequency to the transmitting antenna, and a receiving module for extracting information contained in a high-frequency signal at the second frequency input thereto from the receiving antenna.

In the above information storage and reproducing apparatus, to read information from the storage device, the information read command as the first frequency signal is fed from the transmitting module to the transmitting antenna in the scanner, which in turn transmits the corresponding first frequency electromagnetic wave to irradiate the storage device. The storage device receives through its receiving antenna the first frequency electromagnetic wave, the corresponding current of which is rectified by the rectifier circuit into the DC current. The DC current is supplied to the semiconductor memory, central processor unit and high-frequency transmitting module to drive them. The detector circuit detects the current induced in response to the first frequency electromagnetic wave input to the receiving antenna, and the detected signal is fed to the central processor unit.

While the firs t frequency electromagnetic wave is received, namely, while the DC current is fed from the rectifier circuit, the central processor unit reads the information stored in the semiconductor memory in response to the read command contained in the signal coming in from the detector circuit. The high-frequency transmitting module feeds the read information as the second high-frequency signal to the transmitting antenna, which in turn transmits the corresponding second frequency electromagnetic wave.

The second frequency electromagnetic wave is received by the receiving antenna of the scanner, and its corresponding signal reaches the receiving module. The receiving module extracts information from the second frequency signal, thus reading the information stored in the storage device.

The stored information in the storage device is transmitted on the second frequency electromagnetic wave at almost the same time the first frequency electromagnetic wave is transmitted by the scanner from outside the storage device based on the read command. Thus, the stored information is acquired by receiving it through the scanner. The information storage device needs no internal power supply, thus permitting a semi-permanent use in a maintenance-free fashion.

An information storage and reproducing apparatus for reading information from and writing information to a storage device in a wireless manner, in the seventeenth aspect of the present invention, comprises said storage device comprising a receiving antenna, a transmitting antenna, a detector circuit for detecting the current induced in response to an electromagnetic wave at a first frequency input to the receiving antenna, a rectifier circuit for generating a predetermined DC current based on the current induced in response to the first frequency electromagnetic wave input to the receiving antenna, a semiconductor memory operating from the DC current output from the rectifier circuit, a central processor unit operating from the DC current output from the rectifier circuit, for reading the information stored in the semiconductor memory according to a predetermined read command contained in the signal coming in from the detector circuit, and for writing, according to a predetermined write command contained in said signal, information coming in succession to the write command onto a predetermined address in the semiconductor memory, and a high-frequency transmitting module operating from the DC current output from the rectifier circuit, for feeding the information read by the central processor unit as a high-frequency signal at a second frequency to the transmitting antenna; and a scanner comprising a transmitting antenna, a receiving antenna, a transmitting module for feeding said read command or said write command and information as a high-frequency signal at the first frequency to the transmitting antenna, and a receiving module for extracting information contained in a high-frequency signal at the second frequency input thereto from the receiving antenna.

In the above information storage and reproducing apparatus, to read information from and write information to the storage device, the information read command, the information write command and the information being written as the first frequency signal are fed from the transmitting module to the transmitting antenna in the scanner, which in turn transmits the corresponding first frequency electromagnetic wave to irradiate the storage device. The storage device receives through its receiving antenna the first frequency electromagnetic wave, the corresponding current of which is rectified by the rectifier circuit into the DC current. The DC current is supplied to the semiconductor memory, central processor unit and high-frequency transmitting module to drive them. The detector circuit detects the current induced in response to the first frequency electromagnetic wave input to the receiving antenna, and the detected signal is fed to the central processor unit.

While the first frequency electromagnetic wave is received, namely, while the DC current is fed from the rectifier circuit, the central processor unit reads the information stored in the semiconductor memory in response to the read command contained in the signal coming in from the detector circuit. The high-frequency transmitting module feeds the read information as the second high-frequency signal to the transmitting antenna, which in turn transmits the corresponding second frequency electromagnetic wave.

In response to the write command contained in the signal coming in from the detector circuit, the central processor unit stores, onto a predetermined address in the semiconductor memory, the information being written coming in succession to the write command.

The second frequency electromagnetic wave transmitted by the storage device is received by the receiving antenna in the scanner, and its corresponding second frequency signal reaches the receiving module. The receiving module extracts information from the second frequency signal, thus reading the information stored in the storage device.

The stored information in the storage device is transmitted on the second frequency electromagnetic wave at almost the same time the first frequency electromagnetic wave is transmitted by the scanner from outside the storage device based on the read command. Thus, the stored information is acquired by receiving it through the scanner. Furthermore, the information storage device is irradiated with the first frequency electromagnetic wave according to the information write command and the information being written from outside the storage device using the scanner, and the information being written is stored in the semiconductor memory in the storage device. The stored information is thus easily updated. The information storage device needs no internal power supply, thus permitting a semi-permanent use in a maintenance-free fashion.

An information storage and reproducing apparatus for reading information from a storage device in a wireless manner, in the eighteenth aspect of the present invention, comprises said storage device comprising an ultrasonic receiver for receiving an ultrasonic wave at a first frequency, an ultrasonic transmitter for transmitting an ultrasonic wave at a second frequency in response to input information, a rectifier circuit for generating a predetermined DC current based on the current induced in response to the first frequency ultrasonic wave input to the ultrasonic receiver, a semiconductor memory operating from the DC current output from the rectifier circuit, a central processor unit operating from the DC current output from the rectifier circuit, for reading information stored in the semiconductor memory, and a high-frequency transmitting module operating from the DC current output from the rectifier circuit, for feeding the information read by the central processor unit to the ultrasonic transmitter; and a scanner comprising an ultrasonic transmitter for transmitting the ultrasonic wave at the first frequency, an ultrasonic receiver for receiving the ultrasonic wave at the second frequency, a signal extracting module for extracting a signal component from the current induced in response to the second frequency ultrasonic wave received by the ultrasonic receiver, and an information extracting module for extracting information from the signal provided by the signal extracting module.

In the above information storage and reproducing apparatus, to read the information from the storage device, it is irradiated with the first frequency ultrasonic wave transmitted by the ultrasonic transmitter in the scanner. When the ultrasonic receiver of the storage device receives the first frequency ultrasonic wave, the rectifier circuit generates the DC current based on the first frequency ultrasonic wave. The DC current is supplied to the semiconductor memory, central processor unit and high-frequency transmitting module.

While the first frequency ultrasonic wave is received, namely, while the DC current is fed from the rectifier circuit, the central processor unit reads the information stored in the semiconductor memory. The high-frequency transmitting module feeds the read information as the high-frequency signal at the second frequency to the ultrasonic transmitter, which in turn transmits the corresponding second frequency ultrasonic wave. The second frequency ultrasonic wave is received by the ultrasonic receiver in the scanner, and its corresponding second frequency signal is fed to the signal extracting module. The signal extracting module extracts a signal component from the current induced in response to the second frequency signal, and then the information extracting module extracts the information to be read from the signal component, thus reading the information stored in the storage device.

The stored information in the storage device is transmitted on the second frequency ultrasonic wave at almost the same time the first frequency ultrasonic wave is transmitted by the scanner from outside the storage device. Thus, the stored information is acquired by receiving it through the scanner. The information storage device needs no internal power supply, thus permitting a semi-permanent use in a maintenance-free fashion.

An information storage and reproducing apparatus for reading information from a storage device in a wireless manner, in the nineteenth aspect of the present invention, comprises said storage device comprising an ultrasonic receiver for receiving an ultrasonic wave at a first frequency, a detector circuit for detecting the current induced in response to the ultrasonic wave at the first frequency input to the ultrasonic receiver, an ultrasonic transmitter for transmitting an ultrasonic wave at a second frequency in response to input information, a rectifier circuit for generating a predetermined DC current based on the current induced in response to the first frequency ultrasonic wave input to the ultrasonic receiver, a semiconductor memory operating from the DC current output from the rectifier circuit, a central processor unit operating from the DC current output from the rectifier circuit, for reading the information stored in the semiconductor memory according to a predetermined read command contained in the signal coming in from the detector circuit, and a high-frequency transmitting module operating from the DC current output from the rectifier circuit, for feeding the information read by the central processor unit to the ultrasonic transmitter; and a scanner comprising an ultrasonic transmitter for transmitting said read command on an ultrasonic wave at the first frequency, an ultrasonic receiver for receiving the ultrasonic wave at the second frequency, a signal extracting module for extracting a signal component from the current induced in response to the second frequency ultrasonic wave received by the ultrasonic receiver, and an information extracting module for extracting information from the signal provided by the signal extracting module.

In the above information storage and reproducing apparatus, to read the information from the storage device, it is irradiated with the first frequency ultrasonic wave transmitted by the ultrasonic transmitter of the scanner based on the information read command. When the ultrasonic receiver of the storage device receives the first frequency ultrasonic wave, the rectifier circuit generates the DC current based on the first frequency ultrasonic wave. The DC current is supplied to the semiconductor memory, central processor unit and high-frequency transmitting module. The detector circuit detects the current induced in response to the first frequency ultrasonic wave, and the detected signal is fed to the central processor unit.

While the first frequency ultrasonic wave is received, namely, while the DC current is fed from the rectifier circuit, the central processor unit reads the information stored in the semiconductor memory in response to the read command contained in the signal coming in from the detector circuit. The high-frequency transmitting module feeds the read information as the high-frequency signal at the second frequency to the ultrasonic transmitter, which in turn transmits the corresponding second frequency ultrasonic wave. The second frequency ultrasonic wave is received by the ultrasonic receiver in the scanner, and its corresponding second frequency signal is fed to the signal extracting module. The signal extracting module extracts the signal component from the second signal frequency signal. The information extracting module extracts the signal to be read from the second frequency signal, thus reading the information stored in the storage device.

The stored information in the storage device is transmitted on the second frequency ultrasonic wave at almost the same time the first frequency ultrasonic wave is transmitted by the scanner from outside the storage device based on the read command. Thus, the stored information is acquired by receiving it through the scanner. The information storage device needs no internal power supply, thus permitting a semi-permanent use in a maintenance-free fashion.

An information storage and reproducing apparatus for reading information from and writing information to a storage device in a wireless manner, in the twentieth aspect of the present invention, comprises said storage device comprising an ultrasonic receiver for receiving an ultrasonic wave at a first frequency, a detector circuit for detecting the current induced in response to the ultrasonic wave at the first frequency input to the ultrasonic receiver, an ultrasonic transmitter for transmitting an ultrasonic wave at a second frequency in response to input information, a rectifier circuit for generating a predetermined DC current based on the current induced in response to the first frequency ultrasonic wave input to the ultrasonic receiver, a semiconductor memory operating from the DC current output from the rectifier circuit, a central processor unit operating from the DC current output from the rectifier circuit, for reading the information stored in the semiconductor memory according to a predetermined read command contained in the signal coming in from the detector circuit, and for writing, according to a predetermined write command contained in said signal, information coming in succession to the write command onto a predetermined address in the semiconductor memory, and a high-frequency transmitting module operating from the DC current output from the rectifier circuit, for feeding the information read by the central processor unit to the ultrasonic transmitter; and a scanner comprising an ultrasonic transmitter for transmitting said read command or said write command and information on the ultrasonic wave at the first frequency, an ultrasonic receiver for receiving the ultrasonic wave at the second frequency, a signal extracting module for extracting a signal component from the current induced in response to the second frequency ultrasonic wave received by the ultrasonic receiver, and an information extracting module for extracting information from the signal provided by the signal extracting module.

In the above information storage and reproducing apparatus, to read information from and write information to the storage device, it is irradiated with the first frequency ultrasonic wave transmitted by the ultrasonic transmitter of the scanner based on the information read command, information write command and information to be written. When the ultrasonic receiver of the storage device receives the first frequency ultrasonic wave, the rectifier circuit generates the DC current based on the first frequency ultrasonic wave. The DC current is supplied to the semiconductor memory, central processor unit and high-frequency transmitting module. The detector circuit detects the current induced in response to the first frequency ultrasonic wave, and the detected signal is fed to the central processor unit.

While the first frequency ultrasonic wave is received, namely, while the DC current is fed from the rectifier circuit, the central processor unit reads the information stored in the semiconductor memory in response to the read command contained in the signal coming in from the detector circuit. The high-frequency transmitting module feeds the read information as the high-frequency signal at the second frequency to the ultrasonic transmitter, which in turn transmits the corresponding second frequency ultrasonic wave.

In response to the write command contained in the signal coming in from the detector circuit, the central processor unit stores, onto a predetermined address in the semiconductor memory, the information being written coming in succession to the write command.

The ultrasonic wave transmitted by the storage device is received by the ultrasonic receiver of the scanner, and its corresponding second frequency signal is fed to the signal extracting module. The signal extracting module extracts the signal component from the second signal frequency signal. The information extracting module extracts the signal to be read from the second frequency signal, thus reading the information stored in the storage device.

The stored information in the storage device is transmitted on the second frequency ultrasonic wave at almost the same time the first frequency ultrasonic wave is transmitted by the scanner from outside the storage device based on the read command. Thus, the stored information is acquired by receiving it through the scanner. Furthermore, the information storage device is irradiated with the first frequency ultrasonic wave according to the information write command and the information being written from outside the storage device using the scanner, and the information being written is stored in the semiconductor memory in the storage device. The stored information is thus easily updated. The information storage device needs no internal power supply, thus permitting a semi-permanent use in a maintenance-free fashion.

BRIEF DESCRIPTION OF THE DRAWINGS

FIG. 10 is a block diagram showing the electric circuit of an embodiment 6 of the present invention.

DESCRIPTION OF THE PREFERRED EMBODIMENTS

Figure 1:
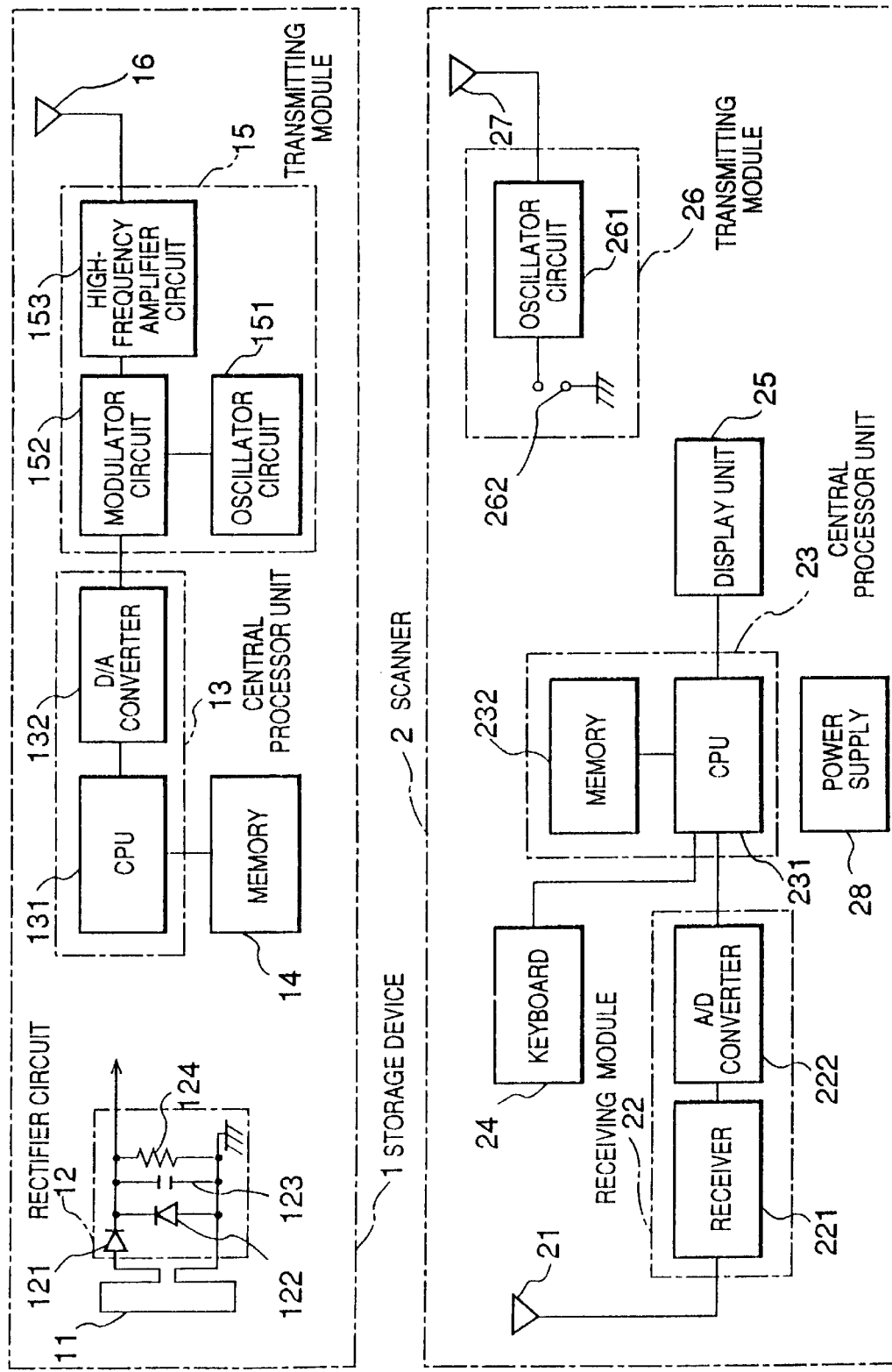
FIG. 1 is a block diagram showing the electric circuit of an embodiment 1 of the present invention.

Referring now to the drawings, the embodiments of the present invention are discussed.

FIG. 1 is the block diagram showing the electric circuit of the embodiment 1 of the present invention. As shown, a storage device 1 comprises a receiving antenna 11, a rectifier circuit 12, a central processor unit 13, a memory 14, a transmitting module 15 and a transmitting antenna 16.

A scanner 2 comprises a receiving antenna 21, a receiving module 22, a central processor unit 23, a keyboard 24, a display unit 25, a transmitting module 26, a transmitting antenna 27 and a power supply 28 for supplying power to these circuit elements. As will be described later, the scanner in the context of this invention means the one that accesses an information storage device (storage device 1) for information by irradiating the storage device 1 with a first frequency electromagnetic wave while receiving a second frequency electromagnetic wave that is transmitted, in response, by the storage device 1.

The rectifier circuit 12 in the storage device 1 is made up of diodes 121, 122, a capacitor 123, and a resistor 124, and forms a known full-wave rectifier circuit. The receiving antenna 11 is connected to the input of the rectifier circuit 12. The rectifier circuit 12 rectifies high-frequency current induced in the receiving antenna 11 into a DC current, and supplies it to the central processor unit 13, the memory 14, and the transmitting module 15 to drive them.

The central processor unit 13 is constructed of a known CPU131 and a digital-to-analog (hereinafter D/A) converter 132. When energized, CPU131 reads information stored in the memory 14 made up of a semiconductor memory such as EEPROM or the like, and outputs it to the transmitting module 15 via the D/A converter 132.

The transmitting module 15 is constructed of an oscillator circuit 151, a modulator circuit 152 and a high-frequency amplifier circuit 153. A carrier signal, for example at 300 MHz, generated by the oscillator circuit 151 is modulated by the modulator circuit 152 according to the information signal coming in from the central processor unit 13. The modulated signal is then fed to the transmitting antenna 16 via the high-frequency amplifier circuit 153.

The receiving module 22 in the scanner 2 is constructed of a receiver 221 and an analog-to-digital (hereinafter A/D) converter 222. The input of the receiver 221 is connected to the receiving antenna 21 to receive the 300 MHz high-frequency signal. The receiver 221 detects the 300 MHz high-frequency signal and outputs the detected signal to the central processor unit 23 via the A/D converter 222.

The central processor unit 23 is constructed of a known CPU231 and a memory 232. In response to an instruction input through the keyboard 24, the central processor unit 23 stores the information coming in through the receiving module 22 onto the memory while presents it on the display unit 25 at the same time.

The transmitting module 26 is constructed of an oscillator circuit 261 and a switch 262. With the switch 262 turned on, the oscillator circuit 261 feeds a high-frequency signal, for example, within a range of 100 kHz to 300 kHz to the transmitting antenna 27.

Figure 2:
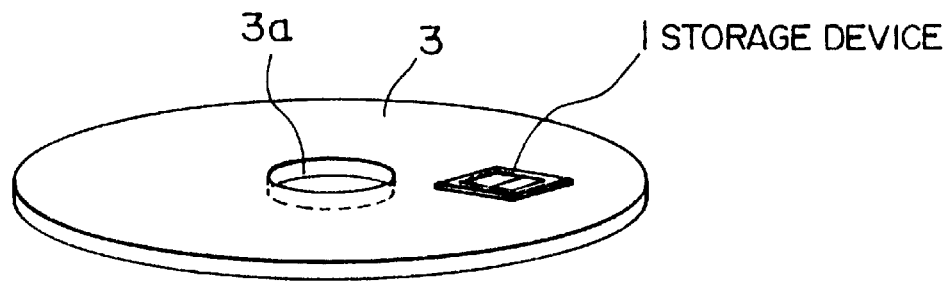
FIG. 2 is an external view showing the storage device in the embodiment 1 of the present invention.

As shown in FIG. 2, the storage device 1 is generally chip-structured in a button-like ceramic mold 3 having a diameter of 2 centimeters or so. The ceramic mold structure 3 has a center through-hole 3a for mounting purpose.

Figure 3:
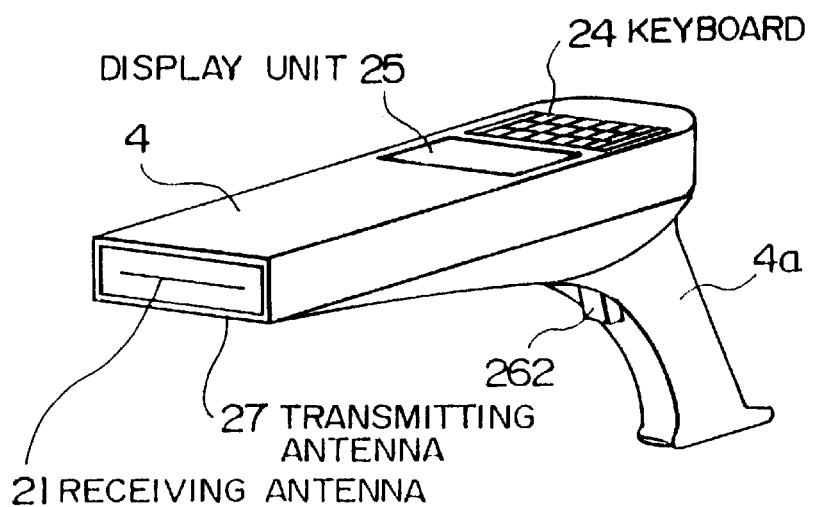
FIG. 3 is an external view showing the scanner in the embodiment 1 of the present invention.

As shown in FIG. 3, the scanner 2 is assembled in a pistol-like housing 4. The receiving antenna 21 and transmitting antenna 27 are mounted on the forward end of the housing 4, and the keyboard 24 and display unit 25 are mounted on the top of the housing 4. The switch 262 is attached on a grip 4a of the housing 4 like a trigger.

In the embodiment thus constructed, the memory 14 of the storage device 1 stores identification information and management information for individual products and members of clubs to manage them.

For example, to manage products, the storage device 1 that stores the date of manufacture, place of manufacture, production lot number and other information is attached to each product. Since the storage device 1 remains attached to each product, its information is ready for an immediate retrieval in the event of a malfunction in the product.

The scanner 2 is used to retrieve the information about each product. The scanner 2 is held in a close vicinity of the storage device 1 on a product that is an object to be investigated, and the switch 262 is turned on. The transmitting module 26 in the scanner 2 feeds the high-frequency signal to the transmitting antenna 27, which in turn transmits an electromagnetic wave in a range of 100 kHz to 300 kHz. The electromagnetic wave is received by the receiving antenna 11 in the storage device 1, where a corresponding high-frequency current is induced therein. The high-frequency current induced in the receiving antenna 11 is rectified by the rectifier circuit 12, and the rectified current is fed to the central processor unit 13, memory 14 and transmitting module 15.

While the electromagnetic wave is received from the scanner 2, the central processor unit 13 is kept powered reading the information programmed beforehand. Specifically, the central processor unit 13 reads the information in the memory 14, and outputs it to the transmitting module 15. The transmitting module 15 modulates a carrier signal with the information read, and the high-frequency modulated carrier signal is fed to the transmitting antenna 16. The transmitting antenna 16 transmits a corresponding electromagnetic wave at 300 MHz.

The scanner 2 receives the 300 MHz electromagnetic wave transmitted by the storage device 1, through the receiving antenna 21. In the scanner 2, the receiving module 22 converts the received information into digital data and sends it to the central processor unit 23.

The central processor unit 23 displays on the display unit 25 the information based on the input digital data, namely, the information about the product received from the storage device 1.

In this embodiment, as described above, the storage device 1 needs no internal power supply, thus permitting semi-permanent use in a maintenance-free fashion. The information individually tags the product itself. Thus, product management is easily performed compared with the known product management that uses a host computer. The storage device 1 stores far larger quantities of information than the prior art bar code systems.

The storage device 1 transmits the information back at almost the same time the electromagnetic wave is received from the scanner 2. Thus, in the production transportation process that uses a belt conveyor, information about moving individual products is easily collected and then managed.

The power supply 28 of the scanner 2 may be a battery or a commercial power line, whichever is suitable for the application conditions of the scanner 2.

Figure 4:
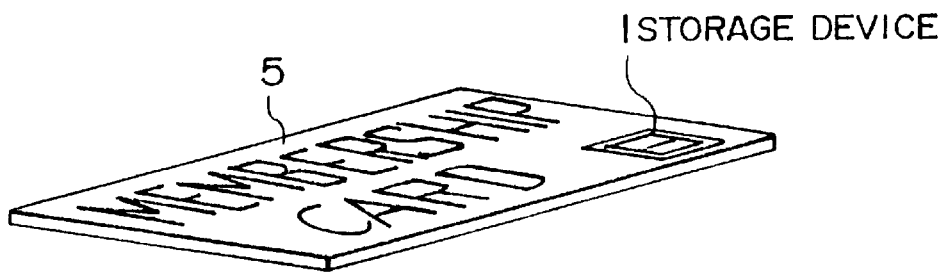
FIG. 4 is an external view showing the storage device in an embodiment 2 of the present invention.
Figure 5:
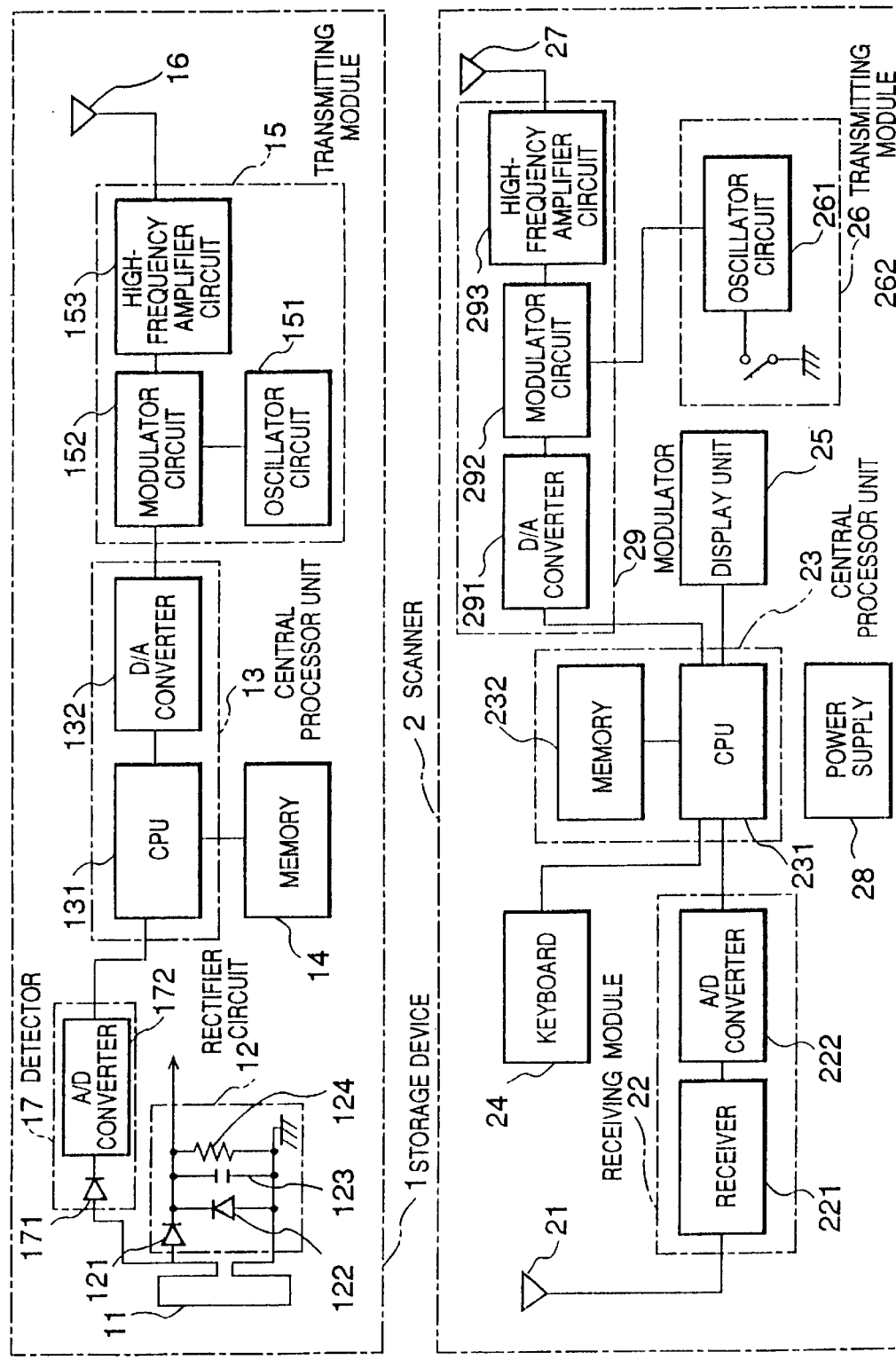
FIG. 5 is a block diagram showing the electric circuit of an embodiment 3 of the present invention.

In the embodiment 2 as shown in FIG. 4, the storage device 1 is sealed in a card 5 of resin or the like. Such a storage device 1 can replace the magnetic cards or IC cards now in use.

The embodiment 3 of the present invention is now discussed.

FIG. 3 is the block diagram showing the electric circuit of the embodiment 3 of the present invention. In FIG. 3, components identical to those described in connection with the embodiment 1 are designated with the same reference numerals, and their discussion is not repeated. The difference between embodiments 1 and 3 is that the embodiment 3 comprises a detector 17 in the storage device 1 and a modulator 29 in the scanner 2.

The detector 17 is constructed of a diode 171 and an A/D converter 172. The anode of the diode 171 is connected to the receiving antenna 11, and the cathode of the diode 171 is connected to CPU131 in the central processor unit 13 via the A/D converter 172.

The modulator 29 is constructed of a D/A converter 291, a modulator circuit 292 and a high-frequency amplifier circuit 293. The input of the D/A converter 291 is connected to CPU231 in the central processor unit 23 and the output of the D/A converter 291 is connected to the modulator circuit 292. The modulator circuit 292 receives a carrier from the transmitting module 26, and modulates and feeds it to the high-frequency amplifier circuit 293. The high-frequency amplifier circuit 293 amplifies the high-frequency signal input and feeds it to the transmitting antenna 27.

In the arrangement of this embodiment, the memory 14 in the storage device 1 stores identification information and management information for individual products and members of clubs to manage them.

For example, to manage products, the storage device 1 that stores the date of manufacture, place of manufacture, production lot number and other information is attached to each product. Since the storage device 1 remains attached to each product, its information is ready for an immediate retrieval in the event of a malfunction in the product.

The scanner 2 is used to retrieve or update the information about each product. The keyboard is used to enter an information read command or information write command. In the case of an information writing operation, the information to be written is together entered through the keyboard. The scanner 2 is held in a close vicinity of the storage device 1 on a product that is an object to be investigated, and the switch 262 is then turned on.

The transmitting module 26 in the scanner 2 feeds the high-frequency signal based on the information read command or information write command to the transmitting antenna 27, which in turn transmits an electromagnetic wave in a range of 100 kHz to 300 kHz. The electromagnetic wave is received by the receiving antenna 11 in the storage device 1, where a corresponding high-frequency current is induced therein. The high-frequency current induced in the receiving antenna 11 is rectified by the rectifier circuit 12, and the rectified current is fed to the central processor unit 13, memory 14 and transmitting module 15.

While the electromagnetic wave is received from the scanner 2, the central processor unit 13 is kept powered executing an instruction programmed beforehand in response to the information read command or write command coming in from the detector 17.

Specifically, in response to the information read command, the central processor unit 13 reads the information stored in the memory 14, and outputs it to the transmitting module 15. The transmitting module 15 modulates a carrier signal with the information read, and the high-frequency modulated carrier signal is fed to the transmitting antenna 16. The transmitting antenna 16 transmits a corresponding electromagnetic wave at 300 MHz.

The scanner 2 receives the 300 MHz electromagnetic wave transmitted by the storage device 1, through the receiving antenna 21 and receiving module 2. In the scanner 2, the receiving module 22 converts the received information into digital data and sends it to the central processor unit 23.

The central processor unit 23 displays on the display unit 25 the information based on the input digital data, namely, the information about the product received from the storage device 1.

When receiving the information write command, the central processor unit 13 stores the information being written coming in along with the write command, onto a predetermined address in the memory 14. The content of the storage device 1 is thus updated.

In this embodiment, as described above, the storage device 1 needs no internal power supply, thus permitting semi-permanent use in a maintenance-free fashion. The information individually tags the product itself. Thus, product management is easily performed compared with the known product management system that uses a host computer. The storage device 1 stores far larger quantities of information than the prior art bar codes.

Since the information stored in the storage device 1 is easily updated or rewritten, this embodiment is advantageously used to record the history of each product. For example, the recycling of the tires of the cars today is a widespread practice. When they are originally manufactured, the storage device 1 may be embedded into or glued onto each tire. Since the storage device 1 remains attached to the tire wherever it goes, information such as the date of manufacture, the plant name of manufacture, the lot number of the product, the date of recycle, the name of the recycling plant, and the total distance run is written onto the storage device 1 and is then read therefrom as necessary. Thus, the history of each tire is accurately known.

The storage device 1 transmits the information back at almost the same time the electromagnetic wave is received from the scanner 2. Thus, in the production transportation process that uses a belt conveyor, information about moving individual products is easily managed.

In the embodiment 2 shown in FIG. 4, the storage device 1 is sealed in a card 5 of resin or the like. Such a storage device 1 can replace the magnetic cards or IC cards now in use. The updating or rewriting of the stored information is easily performed.

In this embodiment, the writing operation is permitted to the storage device 1. Alternatively, the storage device 1 may be designed to be capable of interpreting the information read command only. In this case, the read command may be so assembled that a particular storage device is selected.

The embodiment 4 of the present invention is now discussed.

Figure 6:
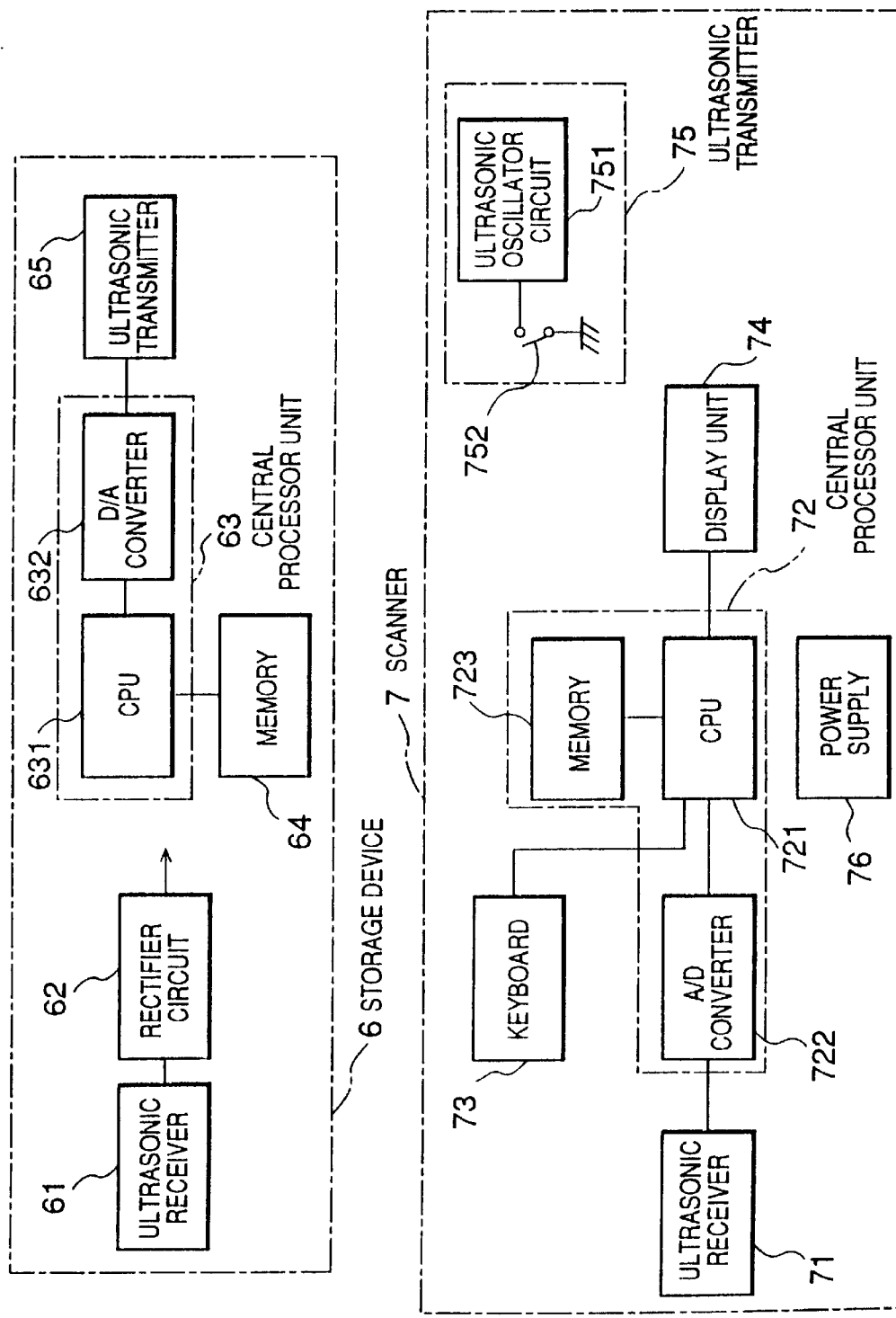
FIG. 6 is a block diagram showing the electric circuit of an embodiment 4 of the present invention.

FIG. 6 is the block diagram showing the electric circuit of the embodiment 4 of the present invention. As shown, a storage device 6 comprises an ultrasonic receiver 61, a rectifier circuit 62, a central processor unit 63, a memory 64, and an ultrasonic transmitter 65.

A scanner 7 comprises an ultrasonic receiver 71, a central processor unit 72, a keyboard 73, a display unit 74, an ultrasonic transmitter 75, and a power supply 76 for supplying these components with power. As will be described later, the scanner in the context of this invention means the one that accesses an information storage device (storage device 6) for information by irradiating the storage device 6 with a first frequency ultrasonic wave while receiving a second frequency ultrasonic wave that is transmitted, in response, by the storage device 6.

The ultrasonic receivers 61, 71 and transmitters 65, 75 are an ultrasonic sensor constructed of an electrostrictive transducer.

The ultrasonic receiver 61 is connected to the input of the rectifier circuit 62 in the storage device 6 to rectify a high-frequency current induced at the ultrasonic receiver 61 into a DC current. The DC current is fed to the central processor unit 63, memory 64, and ultrasonic transmitter 65.

The central processor unit 63 is constructed of a known CPU631 and a digital-to-analog (hereinafter D/A) converter 632. When energized, CPU631 reads information stored in the memory 64 made up of a semiconductor memory such as EEPROM or the like, and outputs it to the ultrasonic transmitter 65 via the D/A converter 632.

The ultrasonic transmitter 65 modulates a carrier, for example, at 300 kHz, according to the information coming in from the central processor unit 63, and transmits it on an ultrasonic wave.

The ultrasonic receiver 71 in the scanner 7 receives the 300 kHz ultrasonic wave, detects and then outputs it to the central processor unit 72.

The central processor unit 72 is constructed of a known CPU721, a A/D converter 722, and a memory 723. In response to the command entered through the keyboard 73, CPU721 stores the information received by the ultrasonic receiver 71 onto the memory 723 and displays it on the display unit 74 as well.

The ultrasonic transmitter 75 is constructed of an ultrasonic oscillator circuit 751 and a switch 752. With the switch 752 turned on, the oscillator circuit 751 outputs an ultrasonic signal within a range of 100 kHz to 300 kHz.

Figure 7:
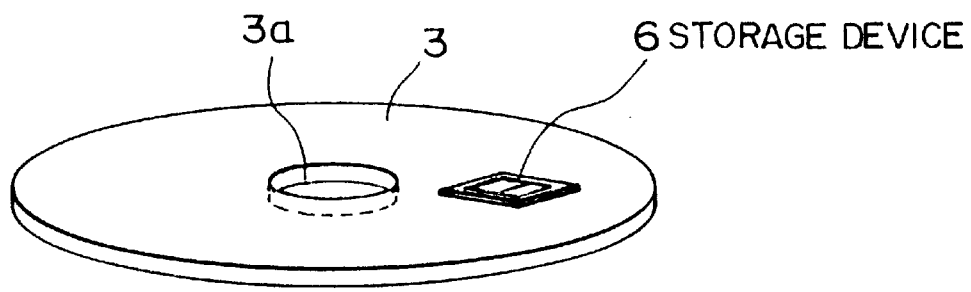
FIG. 7 is an external view showing the storage device in the embodiment 4 of the present invention.

As shown in FIG. 7, the storage device 6 is generally chip-structured in a button-like ceramic mold 3 having a diameter of 2 centimeters or so. The ceramic mold structure 3 has a center through-hole 3a for mounting purpose.

Figure 8:
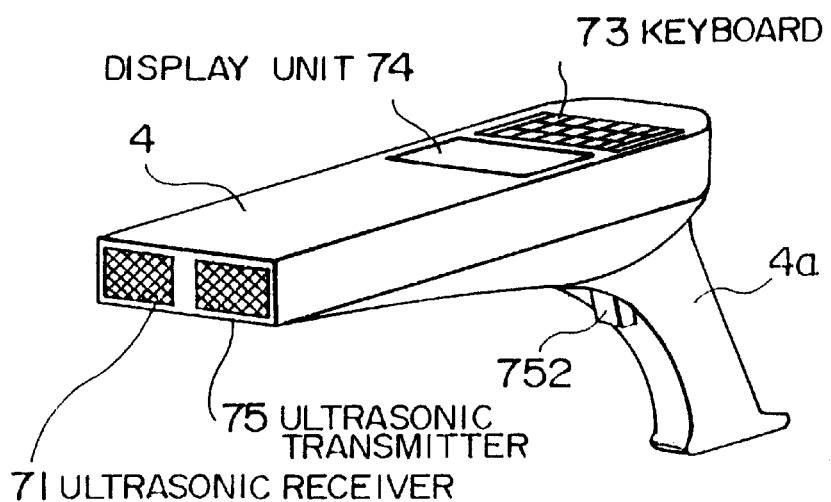
FIG. 8 is an external view showing the scanner in the embodiment 4 of the present invention.

As shown in FIG. 8, the scanner 7 is assembled in a pistol-like housing 4. The ultrasonic receiver 71 and the ultrasonic oscillator circuit 751 are mounted on the forward end of the housing 4, and the keyboard 73 and display unit 74 are mounted on the top of the housing 4. The switch 752 is attached on a grip 4a of the housing 4 like a trigger.

In the embodiment thus constructed, the memory 64 of the storage device 6 stores identification information and management information for individual products and members of clubs to manage them.

For example, to manage products, the storage device 6 that stores the date of manufacture, the place of manufacture, the production lot number and other information is attached to each product. Since the storage device 6 remains attached to each product, its information is ready for an immediate retrieval in the event of a malfunction in the product.

The scanner 7 is used to retrieve the information about each product. The scanner 7 is held in a close vicinity of the storage device 6 on a product that is an object to be investigated, and the switch 752 is turned on. The ultrasonic transmitter 75 in the scanner 7 transmits the ultrasonic signal. The ultrasonic signal is received by the ultrasonic receiver 61 in the storage device 6. The high-frequency current induced at the ultrasonic receiver 61 is rectified by the rectifier circuit 62, and the rectified current is used to power the central processor unit 63, memory 64 and ultrasonic transmitter 65 in the storage device 6.

While the ultrasonic wave is received from the scanner 7, the central processor unit 63 is kept powered reading the information programmed beforehand. Specifically, the central processor unit 63 reads the information in the memory 64, and outputs it to the ultrasonic transmitter 65. The ultrasonic transmitter 65 modulates a carrier signal with the information read, and transmits the modulated signal on the ultrasonic wave at 300 kHz.

The scanner 7 receives the 300 kHz ultrasonic wave transmitted by the storage device 6 through the ultrasonic receiver 71. The ultrasonic receiver 71 feeds the received information to the central processor unit 72.

The central processor unit 72 converts the received information into digital data through the A/D converter 722, and displays on the display unit 74 the information based on the input digital data, namely, the information about the product received from the storage device 6.

In this embodiment, as described above, the storage device 6 needs no internal power supply, thus permitting semi-permanent use in a maintenance-free fashion. The information individually tags the product itself. Thus, product management is easily performed compared with the known product management that uses a host computer. The storage device 6 stores far larger quantities of information than the prior art bar code systems.

While embodiments 1 through 3 employ the electromagnetic wave, this embodiment employs the ultrasonic wave. This embodiment thus successfully works with the storage device embedded in a material that does not transmit the electromagnetic wave therethrough.

The storage device 6 transmits the information back at almost the same time the electromagnetic wave is received from the scanner 7. Thus, in the production transportation process that uses a belt conveyor, information about moving individual products is easily managed.

The power supply 28 of the scanner 7 may be a battery or a commercial power line, whichever is suitable for the application conditions of the scanner 7.

Figure 9:
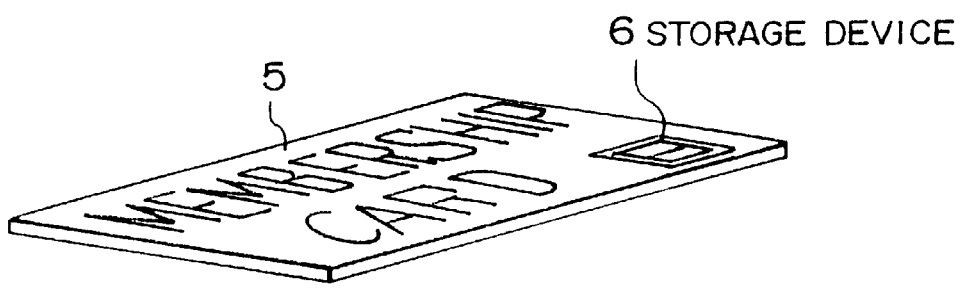
FIG. 9 is an external view showing the storage device in an embodiment 5 of the present invention.

In the embodiment 5 as shown in FIG. 9, the storage device 6 is sealed in a card 5 of resin or the like. Such a storage device can replace the magnetic cards or IC cards now in use.

The embodiment 6 of the present invention is now discussed.

FIG. 10 is the block diagram showing the electric circuit of the embodiment 6 of the present invention. In FIG. 10, components identical to those described in connection with the embodiment 4 are designated with the same reference numerals, and their discussion is not repeated. The difference between embodiments 4 and 6 is that the embodiment 6 comprises a detector 66 in the storage device 6 and a modulator 77 in the scanner 7.

The detector 66 is constructed of a diode 661 and an A/D converter 662. The anode of the diode 661 is connected to the ultrasonic receiver 61, and the cathode of the diode 661 is connected to CPU631 in the central processor unit 63 via the A/D converter 662.

The modulator 77 is constructed of a D/A converter 771 and a modulator circuit 772. The input of the D/A converter 771 is connected to CPU721, and the output of the D/A converter 771 is connected to the modulator circuit 772. The modulator circuit 772 modulates the ultrasonic signal output by an ultrasonic oscillator circuit 751.

In the embodiment thus constructed, the memory 64 of the storage device 6 stores identification information and management information for individual products and members of clubs to manage them.

For example, to manage products, the storage device 6 that stores the date of manufacture, the place of manufacture, the production lot number and other information is attached to each product. Since the storage device 6 remains attached to each product, its information is ready for an immediate retrieval in the event of a malfunction in the product.

The scanner 7 is used to retrieve or update the information about each product. The keyboard 73 is used to enter an information read command or information write command. In the case of an information writing operation, the information to be written is together entered through the keyboard 73. The scanner 7 is held in a close vicinity of the storage device 6 on a product that is an object to be investigated, and the switch 752 is then turned on.

The ultrasonic oscillator circuit 751 in the scanner 7 transmits the information read command or the information write command on the ultrasonic wave. The ultrasonic signal is received by the ultrasonic receiver 61 in the storage device 6. The high-frequency current induced at the ultrasonic receiver 61 is rectified by the rectifier circuit 62, and the rectified current is used to power the central processor unit 63, memory 64 and ultrasonic transmitter 65 in the storage device 6.

While the ultrasonic wave is received from the scanner 7, the central processor unit 63 is kept powered executing an instruction programmed beforehand in response to the information read command or write command coming in from the detector 66.

Specifically, in response to the information read command, the central processor unit 63 reads the information stored in the memory 64, and outputs it to the ultrasonic transmitter 65. The ultrasonic transmitter 65 modulates a carrier signal with the information read, and transmits the modulated signal on the ultrasonic wave at 300 kHz.

The scanner 7 receives the 300 kHz ultrasonic wave transmitted by the storage device 6 through the ultrasonic receiver 71. The ultrasonic receiver 71 feeds the received information to the central processor unit 72.

The central processor unit 72 converts the received information into digital data through the A/D converter 722, and displays on the display unit 74 the information based on the input digital data, namely, the information about the product received from the storage device 6.

When receiving the information write command, the central processor unit 63 stores the information being written coming in along with the write command, onto a predetermined address in the memory 64. The content of the storage device 6 is thus updated.

In this embodiment, as described above, the storage device 6 needs no internal power supply, thus permitting semi-permanent use in a maintenance-free fashion. The information individually tags the product itself. Thus, product management is easily performed compared with the known product management that uses a host computer. The storage device 6 stores far larger quantities of information than the prior art bar codes.

Since the information stored in the storage device 6 is easily updated or rewritten, this embodiment is advantageously used to record the history of each product. For example, the recycling of the tires of the cars today is a widespread practice. When they are originally manufactured, the storage device 6 may be embedded into or glued onto each tire. Since the storage device 6 remains attached to the tire wherever it goes, information such as the date of manufacture, the plant name of manufacture, the lot number of the product, the date of recycle, the name of the recycling plant, and the total distance run is written onto the storage device 6 and is then read therefrom as necessary. Thus, the history of each tire is accurately known.

The storage device 6 transmits the information back at almost the same time the electromagnetic wave is received from the scanner 7. Thus, in the production transportation process that uses a belt conveyor, information about moving individual products is easily managed.

Since this embodiment employs the ultrasonic wave for information exchange between the storage device 6 and the scanner 7, the storage device 6 may be installed within a product that requires an electromagnetic shielding.

As in the embodiment 2 in FIG. 4, the storage device 6 is sealed in a card 5 of resin or the like. Such a storage device 6 can replace the magnetic cards or IC cards now in use, and the updating or rewriting of the stored information is easily performed.

In this embodiment, the writing operation is permitted to the storage device 6. Alternatively, the storage device 6 may be designed to be capable of interpreting the information read command only. In this case, the read command may be so assembled that a particular storage device is selected.

The above-described embodiments 1 through 6 are for example only, and the present invention is not limited to these embodiments.

According the first aspect of the present invention, the stored information in the storage device is transmitted on the second frequency electromagnetic wave at almost the same time the information read command is transmitted on the first frequency electromagnetic wave. The stored information is acquired by receiving the second frequency electromagnetic wave. The information storage device needs no internal power supply, thus permitting a semi-permanent use in a maintenance-free fashion. The information about individual products and users is easily managed using the information storage device instead of the prior art bar code or magnetic card systems. Since the storage device transmits the electromagnetic wave almost at the same time it receives, information management is performed even if the storage device is mounted on a moving object.

According the second aspect of the present invention, the stored information is read only when the read command is given, and is thus retrieved only when it is needed.

According to the third aspect of the present invention, the stored information is read only when the read command is given, and thus retrieved only when it is needed. Furthermore, the desired information is written on the information storage device when a write command is given. Therefore, the addition or update of the information is performed and the management of history information of products is facilitated.

According to the fourth aspect of the present invention, the information storage device features an excellent durability since it is packaged in a ceramic mold.

According to the fifth aspect of the present invention, the stored information in the storage device is transmitted on the second frequency ultrasonic wave at almost the same time the information read command is transmitted on the first frequency ultrasonic wave. The stored information is acquired by receiving the second frequency ultrasonic wave. The information storage device needs no internal power supply, thus permitting a semi-permanent use in a maintenance-free fashion. The information about individual products and users is easily managed using the information storage device instead of the prior art bar code or magnetic card systems. Since the storage device transmits the ultrasonic wave almost at the same time it receives, information management is performed even if the storage device is mounted on a moving object.

According to the sixth aspect of the present invention, the stored information is read only when the read command is given, and is thus retrieved only when it is needed.

According to the seventh aspect, the stored information is read only when the read command is given, and thus retrieved only when it is needed. Furthermore, desired information is written on the information storage device when a write command is given. Therefore, the addition or update of the information is performed and the management of history information of products is facilitated.

According to the eighth aspect of the present invention, the information storage device features an excellent durability since it is packaged in a ceramic mold.

According to the ninth aspect of the present invention, the stored information in the storage device is transmitted on the second frequency electromagnetic wave at almost the same time the scanner transmits the information read command on the first frequency electromagnetic wave. The stored information is acquired by receiving the second frequency electromagnetic wave through the scanner. The information about individual products and users is easily managed using the information storage device instead of the prior art bar code or magnetic card systems.

According to the tenth aspect of the present invention, the stored information in the storage device is transmitted on the second frequency electromagnetic wave at almost the same time the scanner transmits the information read command on the first frequency electromagnetic wave. The stored information is acquired by receiving the second frequency electromagnetic wave through the scanner. The information about individual products and users is easily managed using the information storage device instead of the prior art bar code or magnetic card systems. The stored information in the storage device is read only when the read command is given, and is thus retrieved only when it is needed.

According to the eleventh aspect of the present invention, the stored information in the storage device is transmitted on the second frequency electromagnetic wave at almost the same time the scanner transmits the information read command on the first frequency electromagnetic wave. The stored information is acquired by receiving the second frequency electromagnetic wave through the scanner. The information about individual products and users is easily managed using the information storage device instead of the prior art bar code or magnetic card systems. The stored information in the storage device is read only when the read command is given, and is thus retrieved only when it is needed. Furthermore, desired information is written on the information storage device when a write command is given. Therefore, the addition or update of the information is performed and the management of history information of products is facilitated.

According to the twelfth aspect of the present invention, the stored information in the storage device is transmitted on the second frequency ultrasonic wave at almost the same time the scanner transmits the first frequency ultrasonic wave. The stored information is acquired by receiving the second frequency ultrasonic wave through the scanner. The information about individual products and users is easily managed using the information storage device instead of the prior art bar code or magnetic card systems. Information management is easily performed even when the storage device is embedded in a material that does not transmit the electromagnetic wave therethrough.

According the thirteenth aspect of the present invention, the stored information in the storage device is transmitted on the second frequency ultrasonic wave at almost the same time the scanner transmits the first frequency ultrasonic wave. The stored information is acquired by receiving the second frequency ultrasonic wave through the scanner. The information about individual products and users is easily managed using the information storage device instead of the prior art bar code or magnetic card systems. The stored information in the storage device is read only when the read command is given, and is thus retrieved only when it is needed. Information management is easily performed even when the storage device is embedded in a material that does not transmit the electromagnetic wave therethrough.

According to the fourteenth aspect of the present invention, the stored information in the storage device is transmitted on the second frequency ultrasonic wave at almost the same time the scanner transmits the first frequency ultrasonic wave. The stored information is acquired by receiving the second frequency ultrasonic wave through the scanner. The information about individual products and users is easily managed using the information storage device instead of the prior art bar code or magnetic card systems. The stored information in the storage device is read only when the read command is given, and is thus retrieved only when it is needed. Furthermore, desired information is written on the information storage device when a write command is given. Therefore, the addition or update of the information is performed and the management of history information of products is facilitated. Information management is easily performed even when the storage device is embedded in a material that does not transmit the electromagnetic wave therethrough.

According to the fifteenth aspect of the present invention, the stored information in the storage device is transmitted on the second frequency electromagnetic wave at almost the same time the scanner transmits the first frequency electromagnetic wave to the storage device. The stored information is acquired by receiving the second frequency electromagnetic wave through the scanner. The information storage device needs no internal power supply, thus permitting a semi-permanent use in a maintenance-free fashion. The information about individual products and users is easily managed using the information storage device instead of the prior art bar code or magnetic card systems. Since the storage device transmits the electromagnetic wave almost at the same time it receives, information management is performed even if the storage device is mounted on a moving object.

According to the sixteenth aspect of the present invention, the stored information in the storage device is transmitted on the second frequency electromagnetic wave at almost the same time the scanner transmits the first frequency electromagnetic wave to the storage device. The stored information is acquired by receiving the second frequency electromagnetic wave through the scanner. The information storage device needs no internal power supply, thus permitting a semi-permanent use in a maintenance-free fashion. The information about individual products and users is easily managed using the information storage device instead of the prior art bar code or magnetic card systems. The stored information in the storage device is read only when the read command is given, and is thus retrieved only when it is needed. Since the storage device transmits the electromagnetic wave almost at the same time it receives, information management is performed even if the storage device is mounted on a moving object.

According to the seventeenth aspect of the present invention, the stored information in the storage device is transmitted on the second frequency electromagnetic wave at almost the same time the scanner transmits the first frequency electromagnetic wave to the storage device. The stored information is acquired by receiving the second frequency electromagnetic wave through the scanner. The information storage device needs no internal power supply, thus permitting a semi-permanent use in a maintenance-free fashion. The information about individual products and users is easily managed using the information storage device instead of the prior art bar code or magnetic card systems. The stored information in the storage device is read only when the read command is given, and is thus retrieved only when it is needed. Furthermore, desired information is written on the information storage device when a write command is given. Therefore, the addition or update of the information is performed and the management of history information of products is facilitated. Since the storage device transmits the electromagnetic wave almost at the same time it receives, information management is performed even if the storage device is mounted on a moving object.

According to the eighteenth aspect of the present invention, the stored information in the storage device is transmitted on the second frequency ultrasonic wave at almost the same time the scanner transmits the first frequency ultrasonic wave to the storage device. The stored information is acquired by receiving the second frequency ultrasonic wave through the scanner. The information storage device needs no internal power supply, thus permitting a semi-permanent use in a maintenance-free fashion. The information about individual products and users is easily managed using the information storage device instead of the prior art bar code or magnetic card systems. Since the storage device transmits the ultrasonic wave almost at the same time it receives, information management is performed even if the storage device is mounted on a moving object. Information management is easily performed even when the storage device is embedded in a material that does not transmit the electromagnetic wave therethrough.

According to the nineteenth aspect of the present invention, the stored information in the storage device is transmitted on the second frequency ultrasonic wave at almost the same time the scanner transmits the first frequency ultrasonic wave to the storage device. The stored information is acquired by receiving the second frequency ultrasonic wave through the scanner. The information storage device needs no internal power supply, thus permitting a semi-permanent use in a maintenance-free fashion. The information about individual products and users is easily managed using the information storage device instead of the prior art bar code or magnetic card systems. The stored information in the storage device is read only when the read command is given, and is thus retrieved only when it is needed. Since the storage device transmits the ultrasonic wave almost at the same time it receives, information management is performed even if the storage device is mounted on a moving object. Information management is easily performed even when the storage device is embedded in a material that does not transmit the electromagnetic wave therethrough.

According to the twentieth aspect of the present invention, the stored information in the storage device is transmitted on the second frequency ultrasonic wave at almost the same time the scanner transmits the first frequency ultrasonic wave to the storage device. The stored information is acquired by receiving the second frequency ultrasonic wave through the scanner. The information storage device needs no internal power supply, thus permitting a semi-permanent use in a maintenance-free fashion. The information about individual products and users is easily managed using the information storage device instead of the prior art bar code or magnetic card systems. The stored information in the storage device is read only when the read command is given, and is thus retrieved only when it is needed. Furthermore, desired information is written on the information storage device when a write command is given. Therefore, the addition or update of the information is performed and the management of history information of products is facilitated. Since the storage device transmits the ultrasonic wave almost at the same time it receives, information management is performed even if the storage device is mounted on a moving object. Information management is easily performed even when the storage device is embedded in a material that does not transmit the electromagnetic wave therethrough.

What is claimed is:

1. An information storage device for reading information in a wireless manner comprising:
    an ultrasonic receiver for receiving an ultrasonic wave at a first frequency,
    an ultrasonic transmitter for transmitting an ultrasonic wave at a second frequency in response to input information,
    a rectifier circuit for generating a predetermined DC current based on the current induced in response to the first frequency ultrasonic wave input to the ultrasonic receiver,
    a semiconductor memory operating from the DC current output from the rectifier circuit,
    a central processor unit operating from the DC current output from the rectifier circuit, for reading information stored in the semiconductor memory, and
    a transmitting module operating from the DC current output from the rectifier circuit, for feeding the information read by the central processor unit to the ultrasonic transmitter.

2. An information storage device according to claim 1 further comprising a detector circuit connected to the ultrasonic receiver, for detecting the current induced in response to the first frequency ultrasonic wave input to the ultrasonic receiver, whereby said central processor unit reads the information stored in the semiconductor memory according to a predetermined read command contained in the signal coming in from the detector circuit.

3. An information storage device according to claim 1 further comprising a detector circuit connected to the ultrasonic receiver, for detecting the current induced in response to the first frequency ultrasonic wave input to the ultrasonic receiver, whereby said central processor unit reads the information stored in the semiconductor memory according to a predetermined read command contained in the signal coming in from the detector circuit while writing, according to a predetermined write command contained in said signal, information coming in succession to the write command onto a predetermined address in the semiconductor memory.

4. An information storage device according to one of claims 1 through 3, wherein each of the constituting elements in said storage device is packaged in a ceramic mold.

5. A scanner for reading information from an information storage device in a wireless manner comprising:
   an ultrasonic transmitter for transmitting an ultrasonic wave at a first frequency,
   an ultrasonic receiver for receiving an ultrasonic wave at a second frequency,
   a signal extracting module for extracting a signal component from the current induced in response to the second frequency ultrasonic wave received by the ultrasonic receiver, and
   an information extracting module for extracting information from the signal provided by the signal extracting module, whereby the ultrasonic wave signal at the first frequency is transmitted while the information is read from the information storage device using the ultrasonic wave signal at the second frequency.

6. A scanner for reading information from an information storage device in a wireless manner comprising:
   an ultrasonic transmitter for transmitting an information read command on an ultrasonic wave at a first frequency,
   an ultrasonic receiver for receiving an ultrasonic wave at a second frequency,
   a signal extracting module for extracting a signal component from the current induced in response to the second frequency ultrasonic wave received by the ultrasonic receiver, and
   an information extracting module for extracting information from the signal provided by the signal extracting module, whereby the ultrasonic wave signal at the first frequency is transmitted while the information is read from the information storage device using the ultrasonic wave signal at the second frequency.

7. A scanner for reading information from and writing information to an information storage device in a wireless manner comprising:
   an ultrasonic transmitter for transmitting an information read command or an information write command and information on an ultrasonic wave at a first frequency,
   an ultrasonic receiver for receiving an ultrasonic wave at a second frequency,
   a signal extracting module for extracting a signal component from the current induced in response to the second frequency ultrasonic wave received by the ultrasonic receiver, and
   an information extracting module for extracting information from-the signal provided by the signal extracting module, whereby the ultrasonic wave signal at the first frequency is transmitted to write to the storage device while the information is read from the information storage device using the ultrasonic wave signal at the second frequency.

8. An information storage and reproducing apparatus for reading information from a storage device in a wireless manner comprising:
   said storage device comprising: an ultrasonic receiver for receiving an ultrasonic wave at a first frequency, an ultrasonic transmitter for transmitting an ultrasonic wave at a second frequency in response to input information, a rectifier circuit for generating a predetermined DC current based on the current induced in response to the first frequency ultrasonic wave input to the ultrasonic receiver, a semiconductor memory operating from the DC current output from the rectifier circuit, a central processor unit operating from the DC current output from the rectifier circuit, for reading information stored in the semiconductor memory, and a high-frequency transmitting module operating from the DC current output from the rectifier circuit, for feeding the information read by the central processor unit to the ultrasonic transmitter; and
   a scanner comprising: an ultrasonic transmitter for transmitting the ultrasonic wave at the first frequency, an ultrasonic receiver for receiving the ultrasonic wave at the second frequency, a signal extracting module for extracting a signal component from the second frequency ultrasonic wave received by the ultrasonic receiver, and an information extracting module for extracting information from the signal provided by the signal extracting module.

9. An information storage and reproducing apparatus for reading information from a storage device in a wireless manner comprising:
   said storage device comprising: an ultrasonic receiver for receiving an ultrasonic wave at a first frequency, a detector circuit for detecting the current induced in response to the ultrasonic wave at the first frequency input to the ultrasonic receiver, an ultrasonic transmitter for transmitting an ultrasonic wave at a second frequency in response to input information, a rectifier circuit for generating a predetermined DC current based on the current induced in response to the first frequency ultrasonic wave input to the ultrasonic receiver, a semiconductor memory operating from the DC current output from the rectifier circuit, a central processor unit operating from the DC current output from the rectifier circuit, for reading the information stored in the semiconductor memory according to a predetermined read command contained in the signal coming in from the detector circuit, and a high-frequency transmitting module operating from the DC current output from the rectifier circuit, for feeding the information read by the central processor unit to the ultrasonic transmitter; and
   a scanner comprising: an ultrasonic transmitter for transmitting said read command on the ultrasonic wave at the first frequency, an ultrasonic receiver for receiving the ultrasonic wave at the second frequency, a signal extracting module for extracting a signal component from the current induced in response to the second frequency ultrasonic wave received by the ultrasonic receiver, and an information extracting module for extracting information from the signal provided by the signal extracting module.

10. An information storage and reproducing apparatus for reading information from and writing information to a storage device in a wireless manner comprising:

said storage device comprising: an ultrasonic receiver for receiving an ultrasonic wave at a first frequency, a detector circuit for detecting the current induced in response to the ultrasonic wave at the first frequency input to the ultrasonic receiver, an ultrasonic transmitter for transmitting an ultrasonic wave at a second frequency in response to input information, a rectifier circuit for generating a predetermined DC current based on the current induced in response to the first frequency ultrasonic wave input to the ultrasonic receiver, a semiconductor memory operating from the DC current output from the rectifier circuit, a central processor unit operating from the DC current output from the rectifier circuit, for reading the information stored in the semiconductor memory according to a predetermined read command contained in the signal coming in from the detector circuit, and for writing, according to a predetermined write command contained in said signal, information coming in succession to the write command onto a predetermined address in the semiconductor memory, and a high-frequency transmitting module operating from the DC current output from the rectifier circuit, for feeding the information read by the central processor unit to the ultrasonic transmitter; and a scanner comprising: an ultrasonic transmitter for transmitting said read command or said write command and information on the ultrasonic wave at the first frequency, an ultrasonic receiver for receiving the ultrasonic wave at the second frequency, a signal extracting module for extracting a signal component from the current induced in response to the second frequency ultrasonic wave received by the ultrasonic receiver, and an information extracting module for extracting information from the signal provided by the signal extracting module.

11. The information storage device of claim 1, wherein said ultrasonic receiver is separate from said ultrasonic transmitter.

12. The scanner of claim 5, wherein said ultrasonic transmitter is separate from said ultrasonic receiver.

13. The scanner of claim 6, wherein said ultrasonic transmitter is separate from said ultrasonic receiver.

14. The scanner of claim 7, wherein said ultrasonic transmitter is separate from said ultrasonic receiver.

* * * * *